April 19, 1932.     H. C. BOWEN     1,855,043
TAXICAB DOOR CLOSURE
Filed Feb. 21, 1930    3 Sheets-Sheet 1

Inventor:
Herbert C. Bowen
By Williams, Bradbury, McCaleb & Hinkle
Attys.

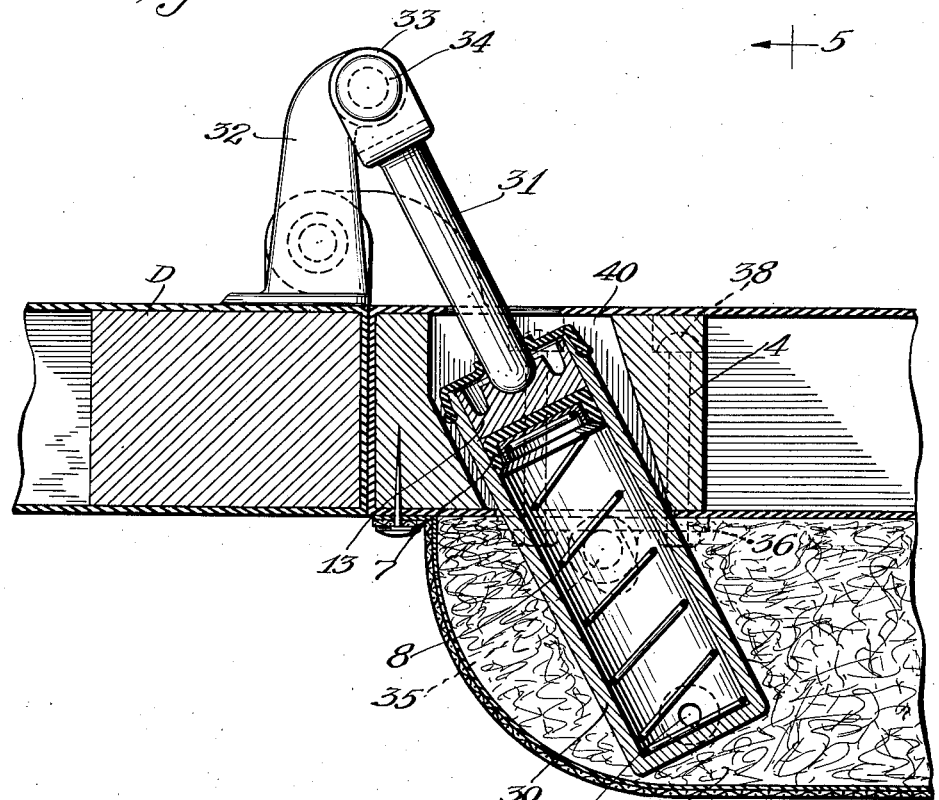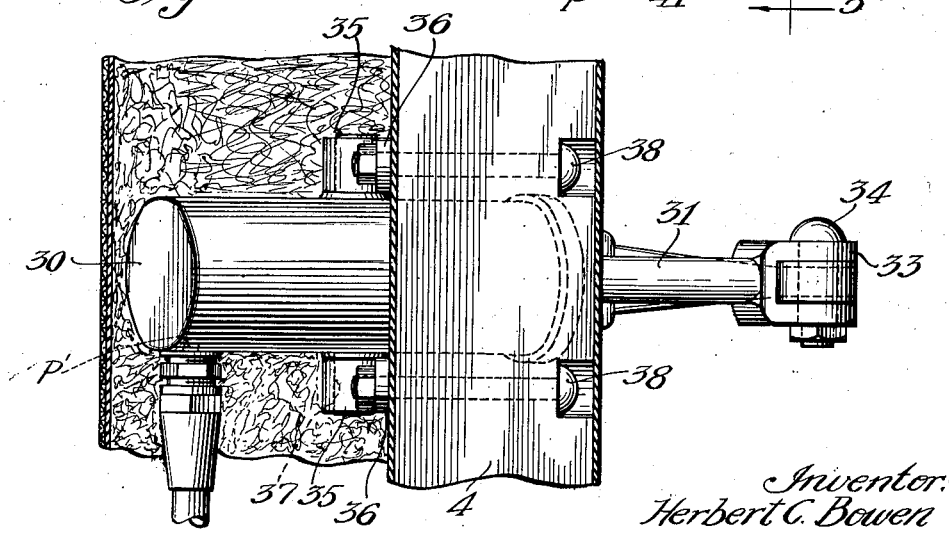

April 19, 1932.   H. C. BOWEN   1,855,043
TAXICAB DOOR CLOSURE
Filed Feb. 21, 1930   3 Sheets-Sheet 3
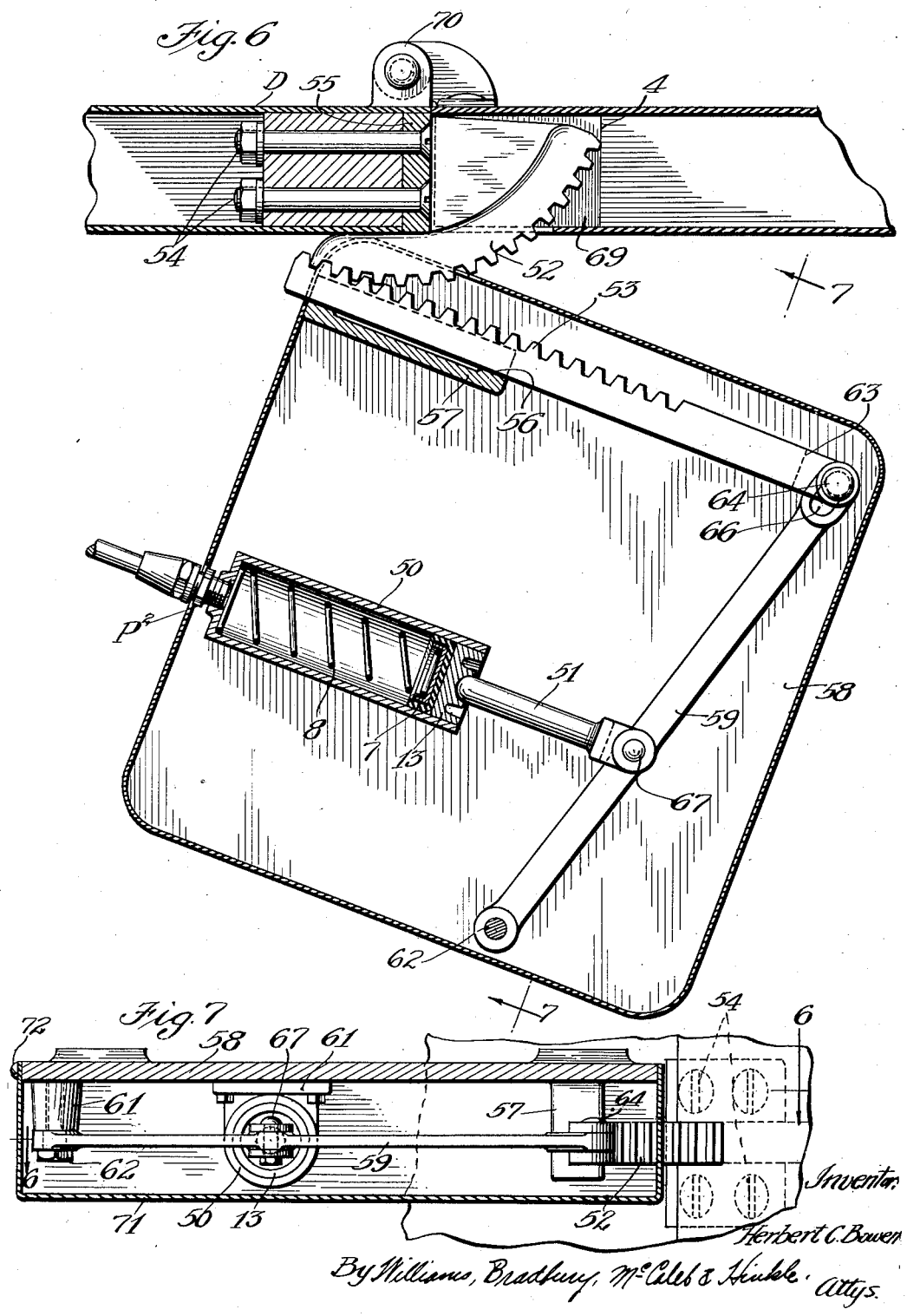

Patented Apr. 19, 1932

1,855,043

UNITED STATES PATENT OFFICE

HERBERT C. BOWEN, OF DETROIT, MICHIGAN, ASSIGNOR TO HYDRAULIC BRAKE COMPANY, OF LOS ANGELES, CALIFORNIA, A CORPORATION OF CALIFORNIA

TAXICAB DOOR CLOSURE

Application filed February 21, 1930. Serial No. 430,166.

My invention relates to a door closing mechanism for closing the door of a motor vehicle, such as a taxi cab, the operation of which is controlled from the brake pedal of a hydraulic braking system.

An object of my invention is the operation of the door closing mechanism in connection with the hydraulic braking system of a motor vehicle and which is under the control of the brake pedal to permit the driver of the vehicle to close the door without leaving the seat.

Another object of my invention is the provision of a hydraulic cylinder connected directly to the hydraulic braking system of the vehicle and linkage between the door of the vehicle and the cylinder to prevent the opening of the door by a passenger during the operation of the brake pedal to bring the vehicle to a stop.

Still another object of my invention is the provision of linking means between the door of the motor vehicle and the hydraulic cylinder whereby the door of the vehicle may be moved from an open to a closed position by the reapplication of the brake pedal.

A still further object of my invention is the association of the hydraulic cylinder of the door closing mechanism with the hydraulic braking system of a motor vehicle whereby the cylinder is filled with fluid during the normal operation of the vehicle so as to require no additional movement of the brake pedal to prevent opening of the door when coming to a stop or when closing the same.

With these and other objects in view the invention consists of novel details of construction and arrangement of parts as will be described more fully hereinafter and particularly pointed out in the claims.

Referring to the drawings forming a part of this specification, like reference characters in the several views denote like parts.

Figure 4 is an enlarged plan view partly in section of the door closure in another of its forms and showing the same operatively associated with a door;

Figure 5 is a sectional view along the line 5—5 of Figure 4 and looking in the direction of the arrows; and Figure 6 is an enlarged plan view partly in section of a door closure in still another of its forms and showing the same operatively associated with the door;

Figure 7 is a sectional view along the line 7—7 of Figure 6 looking in the direction of the arrows.

Figure 1:
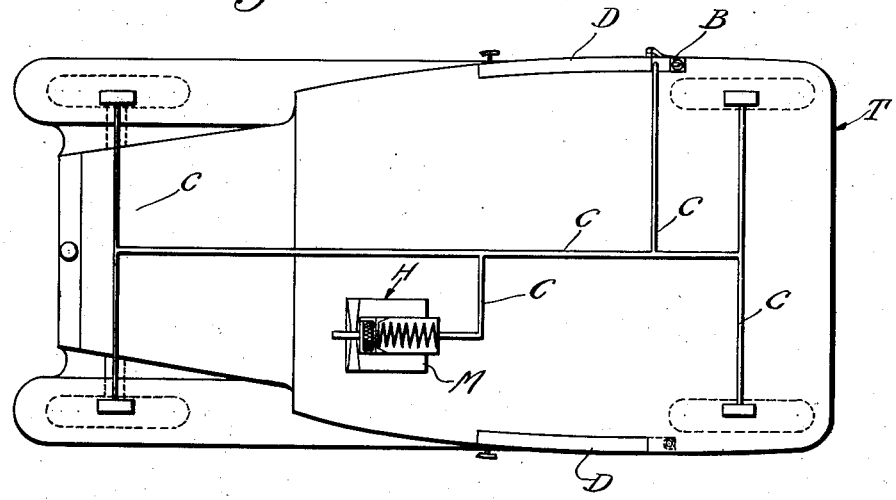
Figure 1 is a plan view of a motor vehicle such as a taxi cab and illustrates the door closure of my invention in association with the door of the same and its connection with the hydraulic braking system.

Referring to Figure 1 of the drawings, the door closure B is associated with the door D of the taxi cab T equipped with a hydraulic braking system H schematically shown. The system in general comprises a master cylinder M under the control of the brake pedal (not shown) and the branch conduits C leading from the cylinder M to the respective brake mechanisms associated with the wheels. The door closure B of my invention is under the control of the hydraulic braking system as shown and is connected thereto through the medium of a branch conduit C' connected respectively to the door closing mechanism and the conduit C of the braking system.

Figure 2:
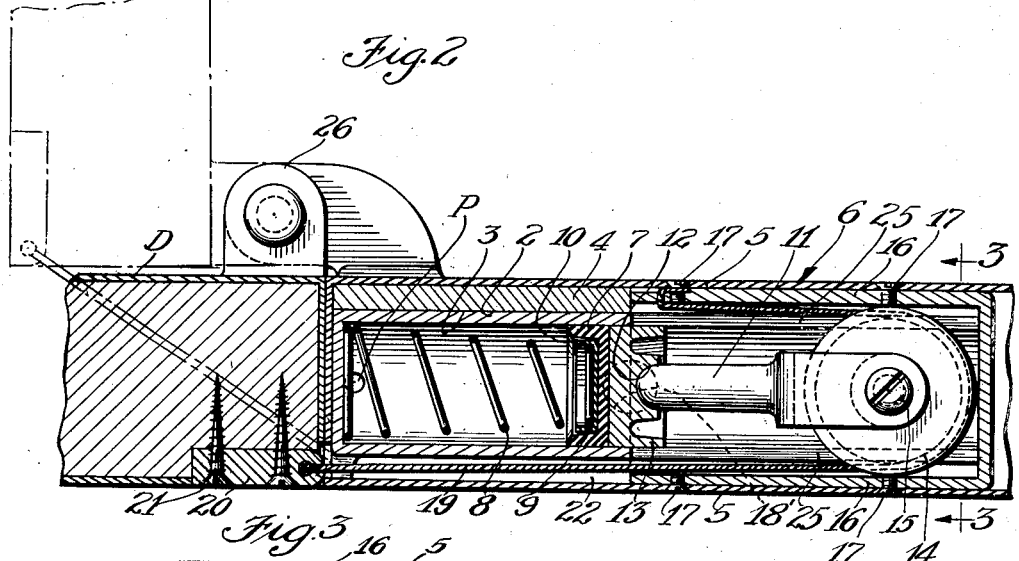
Figure 2 is an enlarged plan view partly in section of the door closure of my invention in one of its forms showing the same operatively associated with the door of a motor vehicle.
Figure 3:
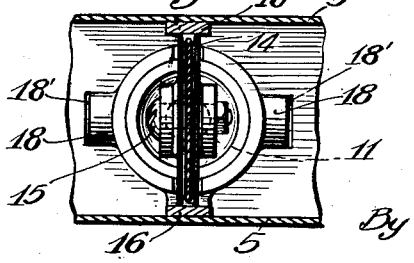
Figure 3 is a sectional view along the line 3—3 of Figure 2 looking in the direction of the arrows.

Referring now to Figure 2, I show one form of door closure operatively associated with the door D. The door closure comprises a cylinder 2 positioned in a horizontal opening 3 in the door jamb 4 which rests between the respective walls 5 of the body 6 of the motor vehicle and a port P in the cylinder is connected by the branch conduit C' to the hydraulic system. A plunger 7 of suitable material, such as rubber, is positioned in the cylinder 2 and a compression spring 8 resting between the base of the cylinder and a metal cup member 9 in a recess 10 in the plunger 7 tends to maintain the plunger 7 in the position shown when the door D is closed, as illustrated in Figure 2. A plunger rod 11 operatively associated with the plunger 7 has its one end rounded and resting in a socket 12 in the bearing plate 13. The other end of the plunger rod 11 is bifurcated to receive a pulley wheel 14 rotatively supported therein by a bolt 15. The forward end of the cylinder 2 is provided with diametrically opposite slots 25 which receive the pulley wheel 14 and serve as guides for the same as the plunger rod 11 is laterally moved to the right or left under the influence of the plunger 7, as will be more fully hereinafter described. A U-shaped retaining member 16 fitting between the respective walls 5 and is fastened to the same by means of the screws 17 and engages the forward end of the cylinder 2 to prevent lateral movement of the same. A pair of diametrically opposite lugs 18 integral with the cylinder wall rest in notches 18' in the door jamb 4 to prevent rotation of the cylinder 2 in the opening 3. The U-shaped member 16 also forms a track against which the pulley wheel rolls to maintain the plunger rod 11 in axial alignment with the cylinder 2.

The door D is hinged to the body 6 by the hinges 26 and a cable 19 passing over the pulley wheel 14 has one end anchored in a plate 20 secured to the door D by the screws 21 and its other end anchored by the screws 17 to operatively associate the door D with the door closure mechanism which includes hydraulic cylinder 2 and its associated parts as just described.

Assuming that the driver of the motor vehicle is approaching a stop, the application of pressure on the brake pedal will effect the master cylinder M to force the fluid which is placed under pressure into the conduits C connected to the braking mechanism to operate the brakes of the same. As the cylinder 2 of the door closing mechanism is connected to the braking system by means of the conduit C' the fluid under pressure also enters the cylinder 2 through the port P and is maintained under pressure as long as the brake pedal is under pressure. Should an attempt be made to open the door D before the vehicle comes to a complete stop or before the brake pedal has been released, the force applied to open the door D creates a pull on the cable 19 which tends to move the plunger rod 11 to the left to force the plunger 7 into the cylinder 2 against the fluid pressure in the same. The fluid in the cylinder 2, however, is maintained under pressure as long as the brake pedal is under pressure and the force applied against the plunger rod 11 by the cable 19 is not sufficient to overcome the pressure in the cylinder 2 and the door thus remains closed against the efforts to open the same. Thus the driver can prevent opening of the door until a complete stop is made and the brake pedal released.

When the brake pedal is released the fluid pressure in the system, including that in the cylinder 2, is decreased, as is well understood, to permit the door to be opened. As the door swings outward to the position indicated in dotted lines in Figure 2 the cable 19 is pulled forward over the pulley wheel 14 to move the plunger rod 11 to the left. The rotatively supported pulley wheel being secured to the plunger rod 11 also moves to the left, being guided in its travel by the guide slots 25. The plunger 7 is forced down into the cylinder 2 under the influence of the moving plunger rod 11 against the tension of the spring 8 to force the fluid contained therein out through the port P back into the braking system and this excess fluid is fed back into the reservoir through the master cylinder M as is well understood. To close the door the driver again actuates the brake pedal which again forces fluid under pressure into the cylinder 2 through the port P. The fluid entering the port P being under pressure again forces the plunger 7 to the right to force the plunger rod 11 and its rotatively supporting pulley wheel 14 in the same direction and through the medium of the cable 19 which passes over the pulley wheel 14 the door is again closed. During the normal operation of the vehicle the door closing cylinder is filled with fluid and no additional movement of the brake pedal is required to apply the brakes and it is only when the door is open that additional movement of the brake pedal is necessary as previously described.

Referring now to Figures 4 and 5, another form of door closure is shown associated with the door D of the motor vehicle and comprises a hydraulic cylinder 30 connected to the hydraulic braking system of the vehicle by a branch conducting conduit secured to the port P' in one end of the cylinder 30. The hydraulic cylinder 30 has essentially the same parts as the cylinder of Figure 2 which include the plunger 7, the compression spring 8 and bearing plate 13 with which the plunger rod 31 is associated. The operating link which connects the door D to the hydraulic cylinder 30 in this instance comprises a bracket 32 secured to the door D. The bracket 32 is provided with a bifurcated right angularly disposed end 33 which bifurcated end is adapted to receive one end of the plunger rod 31 to pivotally connect same to the bracket 32 by means of the pivot screw 34. The other end of the plunger rod is rounded and rests in a socket in the bearing plate 13 which in turn rests against the plunger 7. The cylinder 30 is provided with a pair of integrally formed diametrically opposite pins 35 and brackets 36 which are mounted on opposite sides of the cylinder 30 and are provided with central orifices 37 adapted to receive the pins 35 of the cylinder 2. The brackets 36 are secured against the inner wall of the body 6 by bolts 38 which pass through the door jamb 4 of the body. The cylinder 30 may be rocked in its supporting brackets 36 for the purpose of maintaining the cylinder 30 and its plunger rod 31 in axial alignment and in relation to the pivoted end of the plunger rod 31 in the bracket 32. The cylinder 30 and its plunger rod 31 are angularly disposed to a vertical plane when the door D is closed, as shown in Figure 4, with the forward end of the same extending into an opening 40 in the door jamb 4, also angularly disposed to a vertical plane. The rear portion of the cylinder 30 protrudes from the opening 40 but this protruding portion is concealed by the upholstering 41 as illustrated in Figure 4.

Assuming that the driver of the vehicle approaches a stop to discharge a passenger, the application of pressure to the brake pedal will effect the master cylinder M as previously described and as the cylinder 30 is connected to the braking system, fluid under pressure is forced into the cylinder and against the plunger 7. Should the passenger attempt to open the door D before the vehicle comes to a complete stop or before the brake pedal has been released, the force applied against the door to open the same is transmitted to the plunger rod 31 by the bracket 32. This force is directly applied to the plunger 7 but due to the pressure which has been applied against the plunger 7 by the fluid which was forced into the cylinder 30 by the application of the brake pedal, the force thus applied to open the door is not sufficient to overcome the pressure in the cylinder and the door thus remains closed against the efforts of the passenger to open the same. After the vehicle has come to a complete stop the driver releases the brake pedal, thus permitting the fluid which is under pressure in the cylinder to be released to permit the door D to be opened. As the door D moves out the bracket 32 swings downward with respect to Figure 2 through an arc with the hinge of the door as a center. The pivoted connection, however, between the plunger rod 31 and the bracket 32 and the rockable supporting means of the cylinder 30 permits the cylinder 30 and its plunger rod 31 to be maintained in axial alignment with respect to the pivoted connection between the plunger rod 31 and the bracket 32 from which the force is applied. This movement of the bracket 32 forces the plunger down under the influence of the plunger rod 31 against the tension of the spring 8. To close the door the driver again steps on the brake pedal to force fluid under pressure into the cylinder 30 which again forces the plunger 7 upward and through the medium of the plunger rod 31 which is linked to the bracket 32 the door D is again closed.

Referring now to Figures 6 and 7, still another form of door closure is shown in association with the door D of a motor vehicle. This door closure mechanism also comprises as its operating medium a hydraulic cylinder 50 connected to the hydraulic braking system of the vehicle by a branch conducting conduit secured to the port $P^2$ of the cylinder 50 as clearly shown in Figure 6. The hydraulic cylinder 50 is of a similar construction to that of cylinders 2 and 30 and comprises the same operating parts, including plunger 7, compression spring 8, bearing plate 13 and a plunger rod 51. The operating link which connects the door D to the hydraulic cylinder 50 to control the opening and closing of the same comprises a pair of toothed racks 52 and 53. The toothed rack 52 is secured to the upper edge of the door D and adjacent to the door jamb 4 by means of the bolts 54. This toothed rack 52 is in the form of a toothed segment lying in a horizontal plane with respect to its body portion 55 which is secured to the door as just described. The tooth segment 52 meshes with a toothed rack 53 slidably supported in a slot 56 in a lug 57 integrally formed with the plate member 58 which is secured to the roof structure of the vehicle and also forms supporting means for the hydraulic cylinder 50 and the link 59 which connects the hydraulic cylinder 50 to the toothed rack 53. The cylinder 50 is provided with an integrally formed bracket 60 to provide means for securing the same to the supporting plate 58 as shown. The link 59 has one end pivotally secured to a projecting lug 61 on the plate 58 by a pivot screw 62 and its other end resting in the bifurcated end 63 of the toothed rack 53. A pin member 64 extending through respective orifices in the bifurcated end 63 and the slot 66 in the link member 59 permits movement of the link 59 by the plunger rod 51 which is secured to the link intermediate its ends by a pivot screw 67.

As shown in Figure 6 the door is in closed position and maintains the apparatus just described in the position indicated with the toothed segment 52 extending into opening 69 in the door jamb 4 and its associated toothed rack 53 in its furthermost position to the right into which position they have been moved by a previous application of the brakes to close the door or by the manual closure of the same.

When the brakes are applied by the driver of the vehicle to stop the car fluid under pressure enters the cylinder 50 and should the passenger of the vehicle attempt to open the door D before the same comes to a full stop or before the brake pedal has been released, the force applied to the door to open the same has a tendency to remove the rack 53 to the left under the influence of the toothed segment 52 supported on the door D. The link 59 which is connected to the rack 53 and pivoted at its opposite end to the lug 61 also tends to swing to the left to move the plunger rod 51 inwardly into the cylinder 50. As the fluid in the cylinder 50 is under pressure this movement is prevented and the force applied to the door to open the same is not sufficient to overcome the pressure in the cylinder 50. When the vehicle comes to a complete stop the driver releases the brake pedal which permits the fluid under pressure in the cylinder to decrease and now when force is applied to the door D to open the same the toothed segment 52 with the hinge 70 as a center swings to the left and being in mesh with the rack 53 the said rack is also moved to the left. The connecting link 59 is swung to the left on its pivot 62 which movement of the lever 59 forces the plunger 7 into the cylinder 50 under the influence of the plunger rod 51. To again close the door D the driver again applies pressure to the brake pedal, again forcing fluid under pressure into the cylinder 50 to force the plunger to the right with respect to Figure 6. This movement of the plunger 7 forces the plunger rod 51 out of the cylinder to swing the link 59 to the right about its pivot 62 and this movement of the link 59 causes the rack 53 to be moved in the same direction and as the rack 53 is in mesh with the toothed segment 52 the door is again closed. A protective cap or cover 71 for enclosing the cylinder 15 and its associated mechanism is provided and is secured to the plate 58 by means of the screws 72.

While I have illustrated and described the various forms of door closures of my invention operating in connection with a single door of the motor vehicle or taxicab, it is to be understood however that the various forms of door closures as illustrated and described in the accompanying drawings and specification may be applied to both of the rear doors of the vehicle. In this instance each door closure will be connected by a branch connecting conduit to the hydraulic system and both operated in the manner already described.

Having thus described my invention, what I claim as new and desire to secure by Letters Patent of the United States is:

1. In a door closure of the character described, the combination of a hydraulic braking system for a motor vehicle, a cylinder connected therewith, means for linking said cylinder with the door of the vehicle to move the same from an open to a closed position upon movement of the brake pedal of the system to brake applying position.

2. In a door closure of the character described, the combination of a hydraulic braking system for a motor vehicle, a cylinder connected therewith, means for linking said cylinder with the door of the vehicle to prevent opening of the door when the brake pedal of the system is moved to brake applying position.

3. In a door closure of the character described, the combination of a hydraulic braking system for a motor vehicle, a cylinder connected therewith, means for linking said cylinder with the door of the vehicle to prevent opening of the door by the movement of the brake pedal of said system to brake applying position and to permit opening of the door when the brake pedal of the system is moved to brake releasing position.

4. The combination of a hydraulic brake system for a motor vehicle, a cylinder connected therewith, a plunger in said cylinder, means for linking said plunger with the door of said vehicle, said plunger affected to prevent the opening of the door upon movement of the brake pedal of said system to brake applying position.

5. The combination of a hydraulic brake system for a motor vehicle, a cylinder connected therewith, a plunger in said cylinder, means for linking said plunger with the door of said vehicle, said plunger affected to actuate said linking means to close the door of said vehicle upon the movement of the brake pedal of said system to brake applying position.

6. The combination of a hydraulic braking system for vehicles, a cylinder connected directly therewith, a plunger in said cylinder and a plunger rod associated therewith, means for linking said plunger rod to the door of said vehicle, said plunger affected by the application of pressure on the brake pedal of the system to move said plunger rod to affect said linking means to close said door when open.

7. The combination of a hydraulic braking system for vehicles, a cylinder directly connected therewith, a plunger in said cylinder and a plunger rod movable therewith, linkage for connecting said plunger rod to the door of said vehicle, said plunger affected by the application of pressure on the brake pedal of said system when stopping said vehicle to bar the movement of said plunger rod and said linkage to prevent opening of the said door.

8. The combination of a hydraulic braking system for vehicles, a cylinder directly connected therewith, a plunger in said cylinder and a plunger rod movable therewith, linkage for connecting said plunger rod to the door of said vehicle, said plunger affected by the application of pressure on the brake pedal of said system to move said plunger rod for actuating said linkage to close said door if open and prevent opening of the door when closed until after the release of said brake pedal.

9. The combination of a hydraulic braking system for motor vehicles, a cylinder connected directly therewith for controlling the opening and closing of the door of said vehicle, a plunger in said cylinder, a plunger rod associated with said plunger, means for linking said plunger rod with said cylinder, pressure means in said system affecting said plunger when pressure is applied to the brake pedal of said system to restrain the movement of said plunger rod and said linking means to prevent opening of said door until the pressure on said brake pedal is released, said door when open to be again closed by the reapplication of pressure on said brake pedal to again affect said plunger by said pressure means to actuate said plunger rod and said linking means to close said door.

10. In a door closure of the character described, the combination of a braking system for a motor vehicle, means for linking the braking system with the door of the vehicle to move the same from an open to a closed position upon movement of the brake pedal of the system to brake applying position.

11. In a door closure of the character described, the combination of a braking system for a motor vehicle, means for linking the braking system with the door of the vehicle to prevent opening of the door when the brake pedal of the system is held in brake applying position.

In witness whereof, I hereunto subscribe my name this 17th day of February, 1930.

HERBERT C. BOWEN.